March 24, 1931.  F. L. BAMFORD  1,797,540
VEHICLE LAMP
Filed July 19, 1928

Inventor
Frank L. Bamford

Attorneys

Patented Mar. 24, 1931

1,797,540

UNITED STATES PATENT OFFICE

FRANK L. BAMFORD, OF DETROIT, MICHIGAN, ASSIGNOR TO C. M. HALL LAMP COMPANY, OF DETROIT, MICHIGAN, A CORPORATION OF MICHIGAN

VEHICLE LAMP

Application filed July 19, 1928. Serial No. 293,989.

This invention relates to lamps and has particular reference to means for supporting a mounting or the like from a vehicle lamp.

An object of this invention is to provide a mounting for supporting display matter or the like on a motor vehicle and to provide means for supporting the display mounting from the vehicle headlights without preventing the adjustment of the headlights relative to each other.

A still further object of this invention is to provide a novel fitting attachment for a vehicle lamp, which attachment will be simple in construction, easy to mount on the headlight, and capable of supporting a mounting or the like from the headlight.

Figure 1:
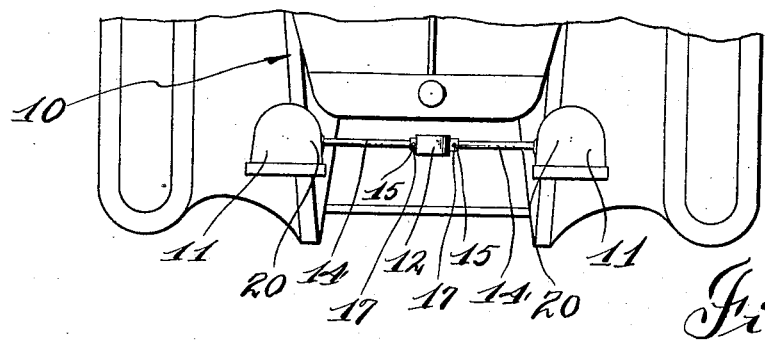
Figure 2:
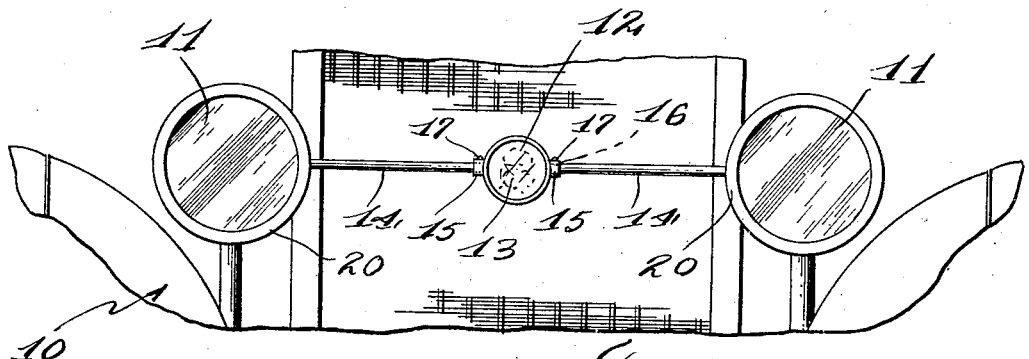
Figure 3:
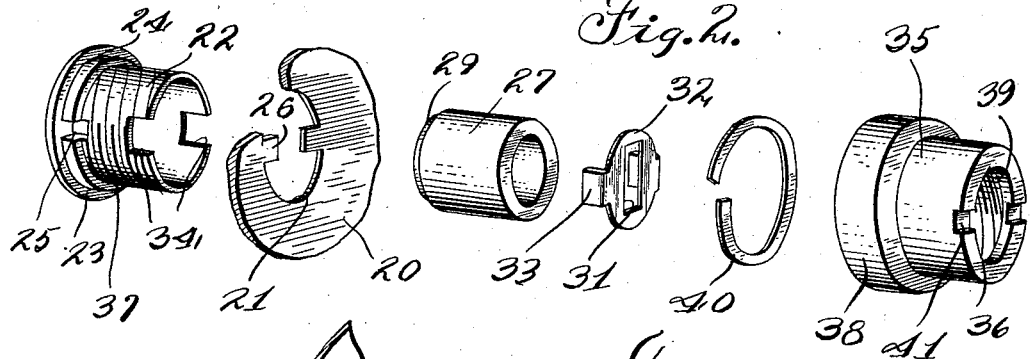
Figure 4:
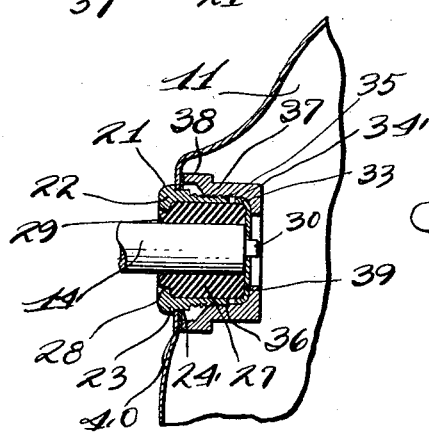

Other objects and advantages of this invention will become apparent as the following description proceeds, particularly when reference is had to the accompanying drawings wherein Figure 1 is a fragmentary plan view of a motor vehicle showing a mounting constructed in accordance with the teachings of this invention installed on the same, Figure 2 is a fragmentary front elevational view of the structure shown in Figure 1, Figure 3 is a detail perspective view of the fitting for supporting the mounting from the lamp casing, the parts of this fitting being shown in spaced relation to each other prior to assembly, and Figure 4 is an enlarged detail sectional view taken through the fitting shown in Figure 3 after the same has been assembled.

Referring now particularly to the drawings, wherein like reference characters designate corresponding parts throughout all views, there is fragmentarily illustrated in Figure 1 a motor vehicle 10, provided, in accordance with the usual practice, with the headlights 11. The headlights 11 may be rigidly mounted on the vehicle 10 in any one of the many customary ways, the exact location and the mounting of these headlights forming no part of the present invention.

The invention contemplates the supporting of display matter or the like between the headlights 11, whereby this display matter may be readily seen from the front of the vehicle. Accordingly as illustrated, in Figures 1 and 2, there is provided a display member 12 having on its front face certain indicia 13 as clearly illustrated in Figure 2 of the drawing. The member 12 may be of any desired size and shape and it is obvious also that the indicia 13 may be of any character whatsoever, as for example, to indicate the make of the vehicle.

For supporting the display member 12 between the headlights 11, there is provided a mounting including the rods or members 14 secured to opposite sides of the display member 12 and adapted to be supported at their free ends from the headlights 11. For securing the members 14 to the display member 12, the latter may be provided with the diametrically opposed laterally extending bosses 15 bored as at 16 to receive the ends of the members 14. Suitable fastening members such as the set screws 17 may be provided for locking the ends of the rods 14 in the bores 16.

As brought out before, the invention contemplates the supporting of the mounting for the display member 12 from the headlights 11. In supporting the mounting from the head lights 11, it is essential that means be provided for permitting adjustment of the headlights independently of each other, since otherwise the headlights could not be properly focused to meet the very exacting requirements of traffic regulations. It forms a feature of this invention therefore to provide means for supporting the display mounting from the headlights 11, while at the same time permitting adjustment of these headlights relative to the mounting and relative to each other.

To accomplish this feature, the fitting shown in Figure 3 is provided, there being one fitting associated with each headlight 11 and each fitting being adapted to support one end of the mounting. As clearly shown in this figure, each headlight 11 includes a casing 20 provided in its side with the aperture or opening 21. Adapted for positioning in the aperture 21 is a sleeve 22, this sleeve being provided on its one end with a head 23 adapted to engage the outer surface of the lamp casing 20, adjacent the opening 21, to limit inward movement of the sleeve 22 when the said sleeve is inserted in the opening from the outside of the casing. For locking the sleeve 22 against rotation in the aperture 21 a bead 24 is formed on the sleeve 22 adjacent the head 23, this bead being recessed at 25 to receive the radially extending diametrically opposed projections 26 formed on the inner periphery of the aperture 21.

Adapted for positioning within the sleeve 22 is a yieldable bushing 27. This bushing may be formed of rubber or any other suitable yieldable material and is adapted to be inserted into the sleeve 22 from the inner end of the same, there being provided a flange 28 on the head 23 for limiting outward movement of the bushing 27. As clearly illustrated in Figure 4 of the drawing, the bushing 27 may be provided with a reduced end 29 adapted to project slightly beyond the head 23 and past the flange 28. The bushing 27 is adapted to form a bearing for the end of the mounting, the rod 14 fitting snugly within this bushing as will be readily apparent by reference to Figure 4 of the drawing. By fitting the end of the member 14 snugly within the bushing 27, the mounting will be substantially rigidly supported, although the resiliency of the bushing 27 will permit a sufficient movement of the member 14 relative to the sleeve 22 to permit an adjustment of the lamp casing 20 and the headlight 11 relative to the member 14.

For preventing a rotation of the members 14 in their respective fittings, each member 14 is provided at its supported end with a flattened portion 30 adapted to engage in a slot 31 formed in a cap member 32. This cap member 32 is adapted to substantially close the inner end of the sleeve 22 and is provided with the angularly bent projections 33 engageable in recesses 34 formed in the inner edge of the sleeve 22, whereby the cap 32 is locked against rotation relative to the sleeve 22.

For locking the sleeve 22, bushing 23 and cap 32 together, and in position in the opening 21, there is provided a sleeve like nut or clamping member 35 interiorly threaded as at 36 to engage suitable threads 37 formed on the outer periphery of the sleeve 22. The clamping member 35 is provided at its one end with the enlarged portion 38 adapted to receive the bead 24 on the sleeve 22 and is provided at its other end with the radially inwardly extending flange 39, adapted to seat against the cap member 32. When the clamping member 35 is threaded onto the sleeve member 22, the portion of the lamp casing 20 adjacent the aperture 21 is clamped between the free edge of the enlarged portion 38 of the member 35 and the head 23 of the sleeve 22. The sleeve 22 is thus rigidly clamped against longitudinal movement in the aperture 21, and since this sleeve is prevented from rotation within the aperture 21 in the manner brought out before, the sleeve is substantially rigid with the casing 20.

If desired, a suitable resilient lock washer 40 may be positioned between the enlarged portion 38 of the clamping member 35 and the lamp casing 15 to prevent an accidental loosening of the clamping member 35, while for threading the member 35 onto the sleeve 22 suitable grooves or recesses 41 may be formed in the flange 39 for engagement by a suitable wrench or other tool.

From the above, it is believed that the features of the invention will be readily apparent. The display member 12 being carried by the mounting including the rods 14 will be supported adjacent the front of the vehicle, whereby the same may be readily seen. Each end of the mounting will be supported in a fitting such as that shown in Figure 3, there being one fitting provided for each headlight. Each fitting will be rigidly secured to the lamp casing of its respective headlight and will snugly embrace one end of the mounting, whereby the mounting will be substantially rigidly supported between the headlights 11. The fittings, however, by including the resilient bushings 27 will permit adjustment of the headlights relative to the mounting and therefore relative to each other, the bushings being adapted to give sufficiently to permit this required adjustment. Thus the headlights may be readily adjusted relative to each other to effect the proper focusing of the light beams, while the mounting for the display member will nevertheless be substantially rigidly supported from these headlights and between the same.

While one form of the invention has been described with considerable detail, it is to be clearly understood that the description is for the purpose of illustration only and is not definitive of the limits of the inventive idea. The right is therefore reserved to make such changes in the details of construction and arrangement of parts as will fall within the purview of the attached claims.

What I claim as my invention is:

1. The combination with a pair of spaced headlights, each being provided with an apertured casing, and a mounting supported by said casings, of means for substantially rigidly fixing the ends of said mounting in the apertures in said casings while permitting adjustment of said casings relative to the mounting and relative to each other, said means including a sleeve mounted in each aperture, each sleeve being provided with a recessed flange, and a projection formed on the inner periphery of each aperture engageable in the recess in the flange of the sleeve mounted therein.

2. The combination with a lamp casing having an aperture, of means for substantially rigidly supporting a mounting in said aperture while permitting adjustment of said casing relative to said mounting, said means including a sleeve mounted in said aperture, means locking said sleeve against rotation relative to said aperture, a yieldable bushing in said sleeve forming a bearing for said mounting, and means for preventing rotation of said mounting in said bushing, said last mentioned means including a slotted cap closing one end of said sleeve, said mounting being provided with a flattened end engageable in said slot.

3. The combination with a lamp casing having an aperture, of means for substantially rigidly supporting a mounting in said aperture while permitting adjustment of said casing relative to said mounting, said means including a sleeve mounted in said aperture, a projection formed on the inner periphery of said aperture for locking said sleeve against rotation, a yieldable bushing in said sleeve forming a bearing for said mounting, a cap on said sleeve slotted to receive the end of said mounting, and means for locking said sleeve, bushing and cap together and in position in said aperture.

4. The combination with a lamp casing having an aperture, of means for substantially rigidly supporting a mounting in said aperture while permitting adjustment of said casing relative to said mounting, said means including a sleeve mounted in said aperture, a projection formed on the inner periphery of said aperture for locking said sleeve against rotation, a yieldable bushing in said sleeve forming a bearing for said mounting, a cap on said sleeve slotted to receive the end of said mounting, and means for locking said sleeve, bushing and cap together and in position in said aperture, said last mentioned means comprising a sleeve like clamping nut threadedly engageable with said sleeve.

In testimony whereof I affix my signature.

FRANK L. BAMFORD.